United States Patent
Tanaka

[11] Patent Number: 5,990,987
[45] Date of Patent: Nov. 23, 1999

[54] TRANSVERSE ELECTRICAL FIELD LCD WITH ISLANDS HAVING A PATTERN THE SAME AS THE COMBINED PATTERN OF GATE ELECTRODES, GATE BUS LINES AND COUNTER ELECTRODES

[75] Inventor: Hiroaki Tanaka, Tokyo, Japan

[73] Assignee: NEC Corporation, Tokyo, Japan

[21] Appl. No.: 09/192,535

[22] Filed: Nov. 17, 1998

[30] Foreign Application Priority Data

Nov. 18, 1997 [JP] Japan .................................. 9-317344

[51] Int. Cl.⁶ ......................... G02F 1/136; G02F 1/1343
[52] U.S. Cl. .......................... 349/43; 349/139; 349/141
[58] Field of Search ................................. 349/139, 141, 349/143, 42, 43

[56] References Cited

U.S. PATENT DOCUMENTS

| | | | |
|---|---|---|---|
| 5,760,857 | 6/1998 | Yanagawa et al. | 349/141 |
| 5,831,707 | 11/1998 | Ota et al. | 349/141 |
| 5,841,498 | 11/1998 | Baur et al. | 349/141 |
| 5,841,499 | 11/1998 | Baur et al. | 349/141 |
| 5,852,485 | 12/1998 | Shimada et al. | 349/141 |

FOREIGN PATENT DOCUMENTS

| | | |
|---|---|---|
| 63-21907 | 5/1988 | Japan . |
| 3-49237 | 3/1991 | Japan . |

*Primary Examiner*—William L. Sikes
*Assistant Examiner*—Heidi L. Eisenhut
*Attorney, Agent, or Firm*—Sughrue, Mion, Zinn, Macpeak & Seas, PLLC

[57] ABSTRACT

In a production process for a transverse electrical field type active matrix liquid crystal display apparatus, a photolithographic step is eliminated to reduce the cost. There are formed on an insulating substrate carrying thin-film transistors as switching elements, drain electrodes 31, drain bus lines 32 connected to the drain electrodes 31, source electrodes 33 and pixel electrodes 34 formed by the first low-resistance electrically conductive film 3. Islands are formed on the resulting assembly by a semiconductor film. There are further formed on the resulting product gate electrodes 61, gate bus lines 62 and counter electrodes 63. The gate electrodes 61, gate bus lines 62, counter electrodes 63 and the islands 71 can be formed by a sole photolithographic step to reduce the number of the photographic steps and hence the cost.

5 Claims, 10 Drawing Sheets

1: INSULATING SUBSTRATE
2: TRANSPARENT INSULATING FILM
3: LOW RESISTANCE METAL FILM
4: SEMICONDUCTOR LAYER
5: TRANSPARENT INSULATING FILM
6: LOW RESISTANCE METAL FILM
7: n-TYPE SEMICONDUCTOR LAYER
33: SOURCE ELECTRODE
61: GATE ELECTRODE
62: GATE BUS LINE
63: COUNTER ELECTRODE
71: ISLAND

1: INSULATING SUBSTRATE
2: TRANSPARENT INSULATING FILM
3: 2ND LOW RESISTANCE METAL FILM
31: DRAIN ELECTRODE
32: DRAIN BUS LINE
33: SOURCE ELECTRODE
34: PIXEL ELECTRODE

1: INSULATING SUBSTRATE
2: TRANSPARENT INSULATING FILM
3: LOW RESISTANCE METAL FILM
4: SEMICONDUCTOR LAYER
5: TRANSPARENT INSULATING FILM
6: LOW RESISTANCE METAL FILM
7: n-TYPE SEMICONDUCTOR LAYER
33: SOURCE ELECTRODE
61: GATE ELECTRODE
62: GATE BUS LINE
63: COUNTER ELECTRODE
71: ISLAND

FIG. 3

1: INSULATING SUBSTRATE
9: ORIENTATION FILM
10: INSULATING SUBSTRATE
32: DRAIN BUS LINE
34: PIXEL ELECTRODE
63: SOURCE ELECTRODE
101R, 101G, 101B: FILTER
102: ORIENTATION FILM
103: LIQUID CRYSTAL
104, 105: POLARIZING PLATE

1: INSULATING SUBSTRATE
8: TRANSPARENT CONDUCTIVE FILM
81: DRAIN ELECTRODE
82: DRAIN BUS LINE
83: SOURCE ELECTRODE
84: PIXEL ELECTRODE

1: INSULATING SUBSTRATE
3': PLATING FILM
8: TRANSPARENT CONDUCTIVE FILM
81: DRAIN ELECTRODE
82: DRAIN BUS LINE
83: SOURCE ELECTRODE
84: PIXEL ELECTRODE

1: INSULATING SUBSTRATE
4: SEMICONDUCTOR LAYER
5: TRANSPARENT INSULATING FILM
6: LOW RESISTANCE METAL FILM
8: TRANSPARENT CONDUCTIVE FILM
41: ISLAND
61: GATE ELECTRODE
62: GATE BUS LINE
81: DRAIN ELECTRODE
82: DRAIN BUS LINE
83: SOURCE ELECTRODE
84: PIXEL ELECTRODE

1: INSULATING SUBSTRATE
2: TRANSPARENT INSULATING FILM
3: LOW RESISTANCE METAL FILM
31: DRAIN ELECTRODE
32: DRAIN BUS LINE
33: SOURCE ELECTRODE
34: PIXEL ELECTRODE

1: INSULATING SUBSTRATE
2: TRANSPARENT INSULATING FILM
3: LOW RESISTANCE METAL FILM
7: n-TYPE SEMICONDUCTOR LAYER
7a: OHMIC CONTACT AREA
31: DRAIN ELECTRODE
32: DRAIN BUS LINE
33: SOURCE ELECTRODE
34: PIXEL ELECTRODE

1: INSULATING SUBSTRATE
2: TRANSPARENT INSULATING FILM
3: LOW RESISTANCE METAL FILM
7: n-TYPE SEMICONDUCTOR LAYER
31: DRAIN ELECTRODE
32: DRAIN BUS LINE
33: SOURCE ELECTRODE
34: PIXEL ELECTRODE
41: ISLAND

1: INSULATING SUBSTRATE
2: TRANSPARENT INSULATING FILM
3: LOW RESISTANCE METAL FILM
4: SEMICONDUCTOR LAYER
7: n-TYPE SEMICONDUCTOR LAYER
31: DRAIN ELECTRODE
32: DRAIN BUS LINE
33: SOURCE ELECTRODE
34: PIXEL ELECTRODE
41: ISLAND
61: COUNTER ELECTRODE
62: GATE BUS LINE

TRANSVERSE ELECTRICAL FIELD LCD WITH ISLANDS HAVING A PATTERN THE SAME AS THE COMBINED PATTERN OF GATE ELECTRODES, GATE BUS LINES AND COUNTER ELECTRODES

FIELD OF THE INVENTION

This invention relates to an active matrix liquid crystal display apparatus having thin-film transistors as switching elements and, more particularly, to a transverse electrical field type active matrix liquid crystal display apparatus and a method for preparation thereof.

BACKGROUND OF THE INVENTION

Figure 4A:
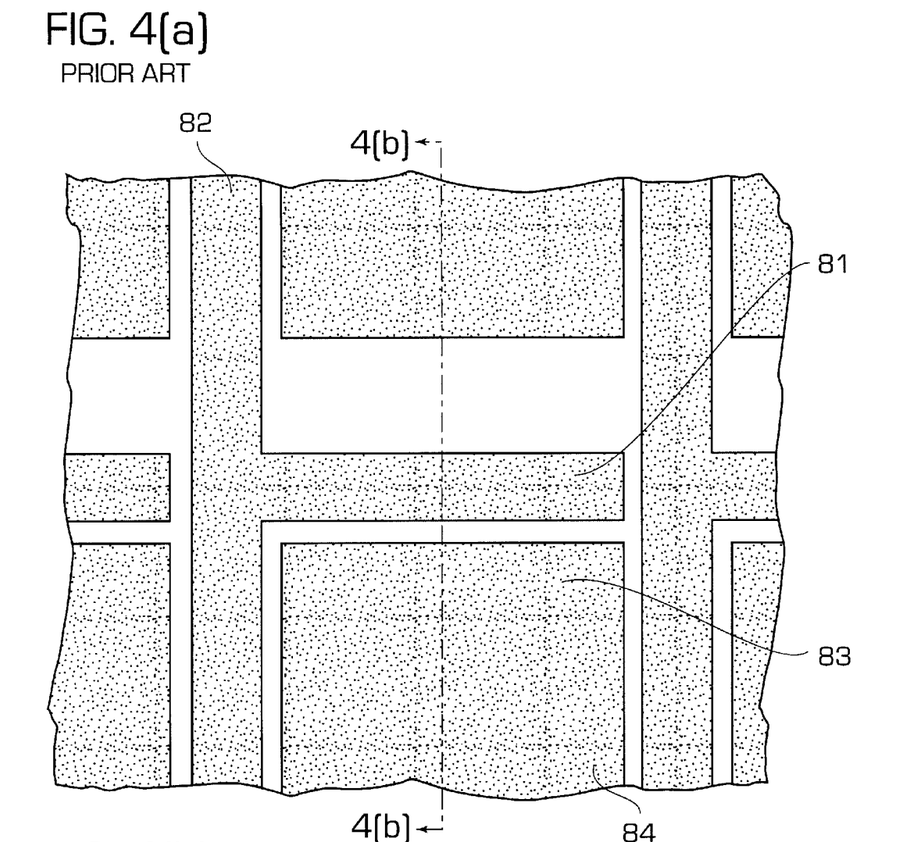
FIGS. 4(a) to 4(b) is a plan view for illustrating the production process (1) of a first conventional example and a cross-sectional view along line A—A.
Figure 4B:
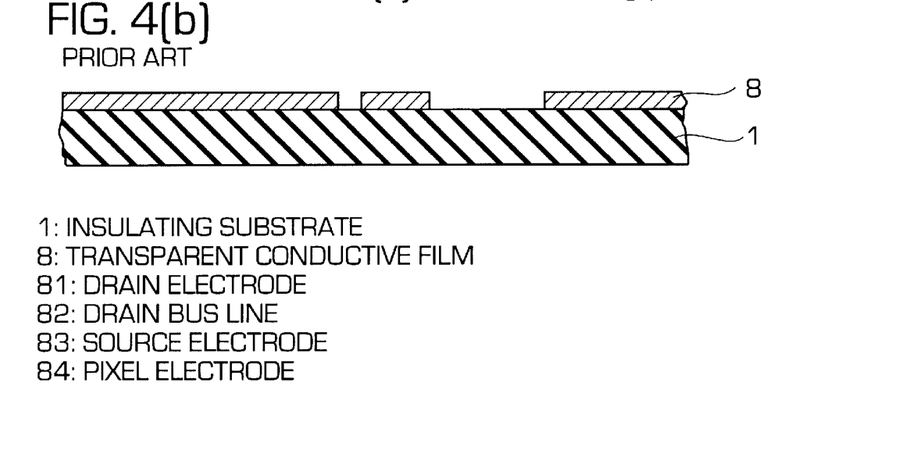
Figure 5A:
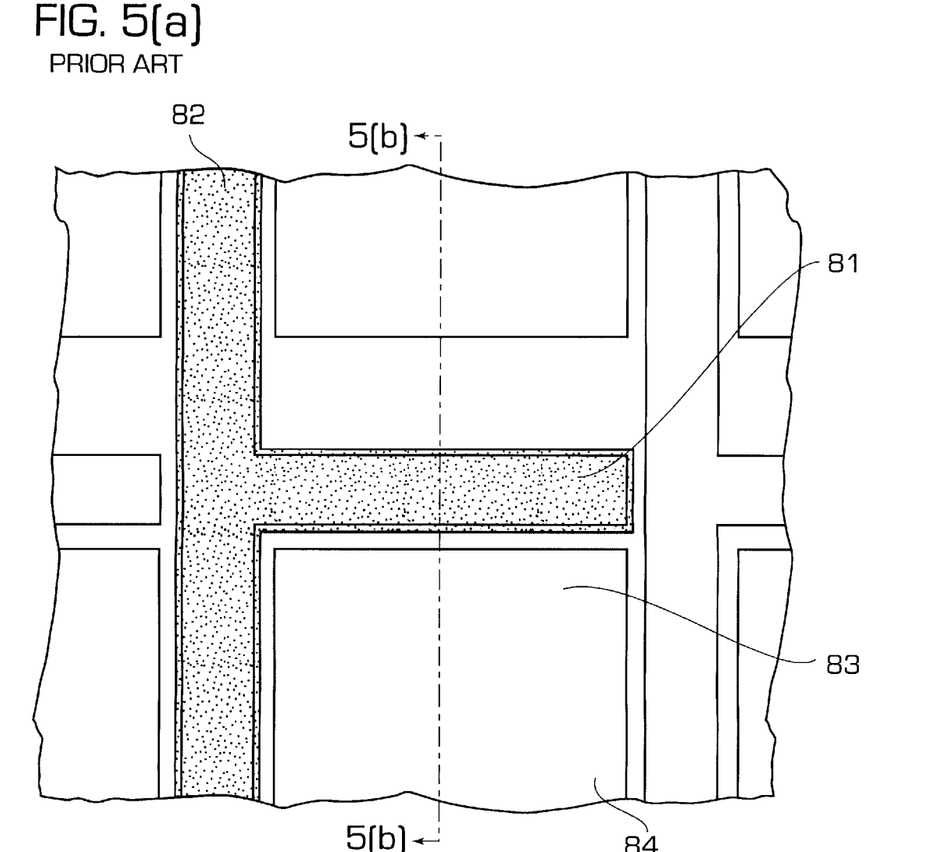
FIGS. 5(a) to 5(b) is a plan view for illustrating the production process (2) of the first conventional example and a cross-sectional view along line A—A.
Figure 5B:
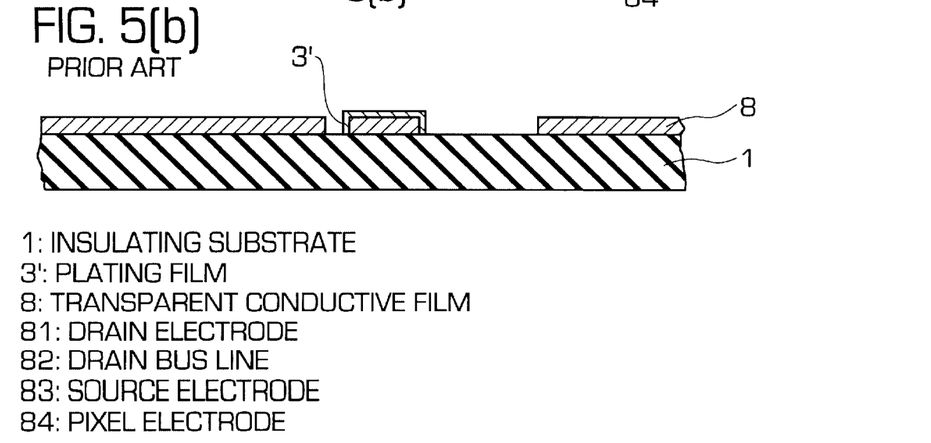
Figure 6A:
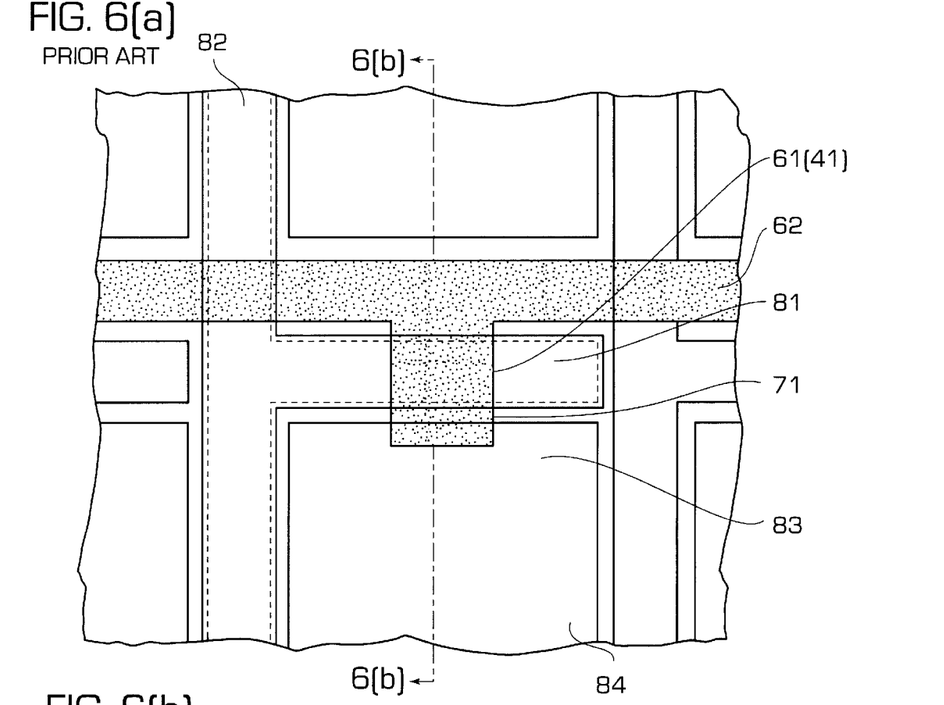
FIG. 6(a) to 6(b) is a plan view for illustrating the production process (3) of the first conventional example and a cross-sectional view along line A—A.
Figure 6B:
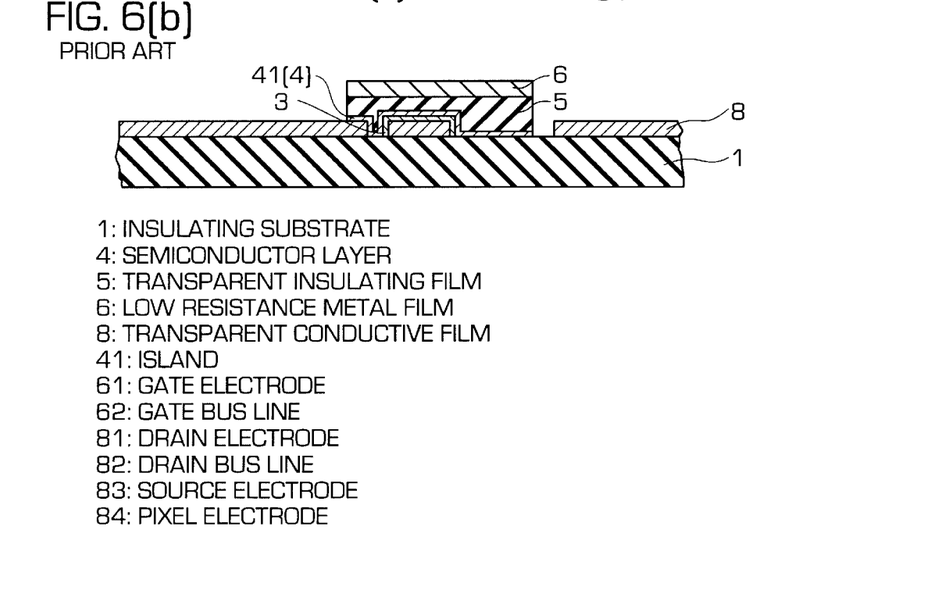

Recently, a thin-film transistor having semiconductor films, such as films of non-crystalline silicon, polycrystalline silicon or CdSe, is used as a switching element for a liquid crystal cell of the active matrix liquid crystal display apparatus. FIGS. 4 to 6 show, step-by-step, a production process for a conventional liquid crystal display device of this type (first conventional example) as proposed in JP Patent Kokai JP-A-3-49237 (1991). In each of these figures, (a) and (b) show plan views and cross-sectional views taken along line A—A, respectively. First, a transparent electrically conductive film 8 of, for example, indium tin oxide (ITO), is formed by sputtering on an insulating substrate 1, and patterned by a photolithographic process and wet or dry etching, to form a drain electrode 81, a drain bus line 82 connected to the drain electrode 81, a source electrode 83 and a pixel electrode 84 connected to the source electrode 83, as shown in FIG. 4.

Then, current is allowed to flow through the drain electrode 81 and the drain bus line 82 on the insulating substrate 1 formed in the above step to form a low-resistance plating layer 3' by electrical nickel plating. Then, a semiconductor film 4 of, for example, amorphous silicon (a-Si) and an insulating film 5 of, for example, silicon nitride (SiN) are formed by the plasma CVD method on the insulating substrate 1, as shown in FIG. 6. A low-resistance metal film 6 of chromium (Cr) is formed thereon by sputtering. The resulting assembly is patterned by a photolithographic process and wet or dry etching, to form a gate electrode 61, a gate bus line 62 connected to the gate electrode 61 and an island 41 formed by the semiconductor film 4 coextensive as the gate 61 and the gate bus line 62.

Since the first conventional example is of the longitudinal electrical field type in which an electrical field is applied in a direction perpendicular to the planar direction of the substrate, it is necessary to form a counter electrode entirely facing the pixel electrode 84 on the entire surface of the counter substrate, not shown in the drawing, arranged at a preset separation distance from the insulating substrate 1. Thus, the drain electrode 81 and the gate electrode 61 are necessarily facing the counter electrode, so that a parasitic capacitance is inevitably produced between the drain electrode 81, source electrode 83 and the counter electrode. This parasitic capacitance significantly affects the power consumption such that the electric power for charging/discharging the capacitance across the pixel electrode and the counter electrode amounts to tens to hundreds of the power required for actual display. Also, since the drain bus line 82 and the pixel electrode 84 are formed simultaneously, the drain bus line 82 needs to be formed by a transparent electrically conductive film having a high resistance, while a plating film 3' needs to be formed by a process such as metal plating for lowering the wiring resistance, thus complicating the production process and the structure.

Figure 7A:
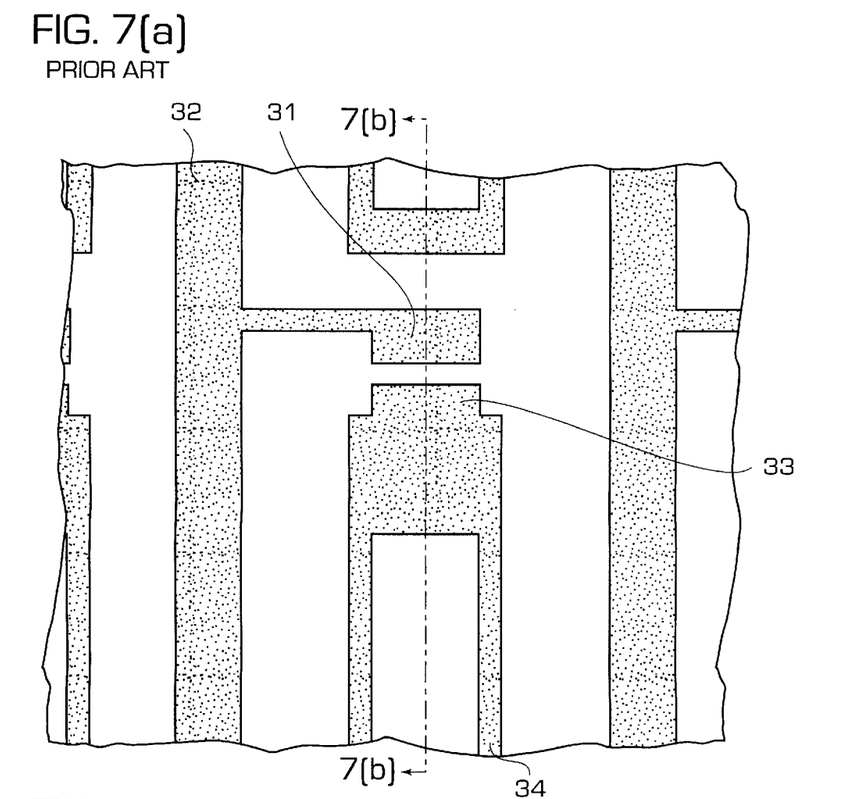
FIGS. 7(a) to 7(b) is a plan view for illustrating the production process (1) of a second conventional example and a cross-sectional view along line A—A.
Figure 7B:
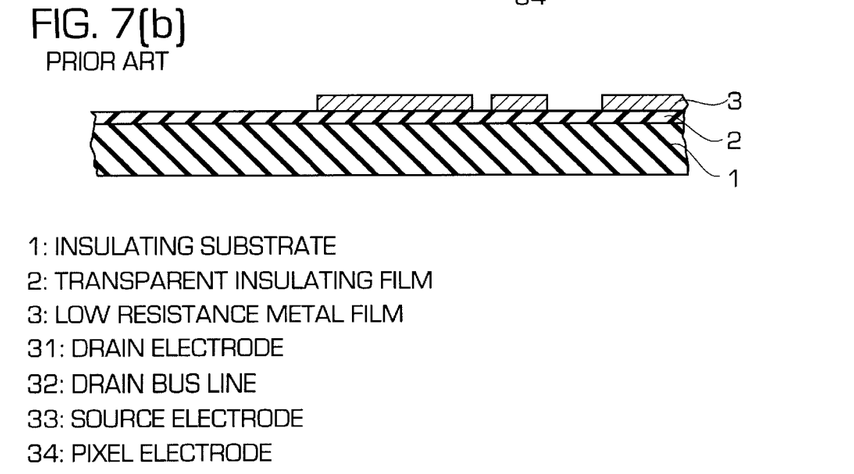
Figure 8A:
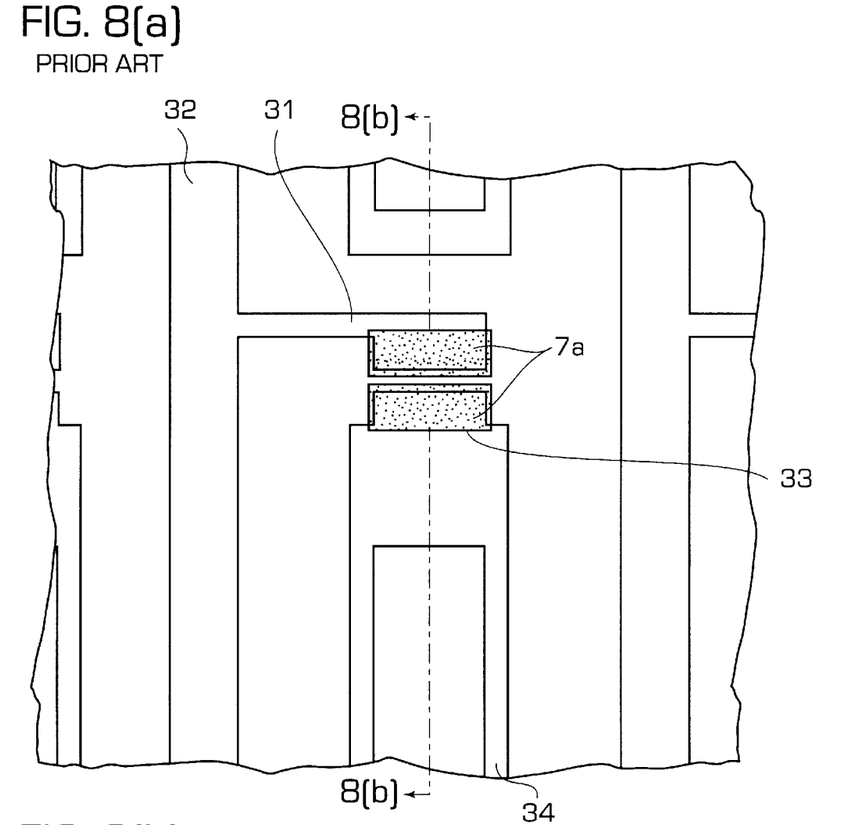
FIGS. 8(a) to 8(b) is a plan view for illustrating the production process (2) of the second conventional example and a cross-sectional view along line A—A.
Figure 8B:
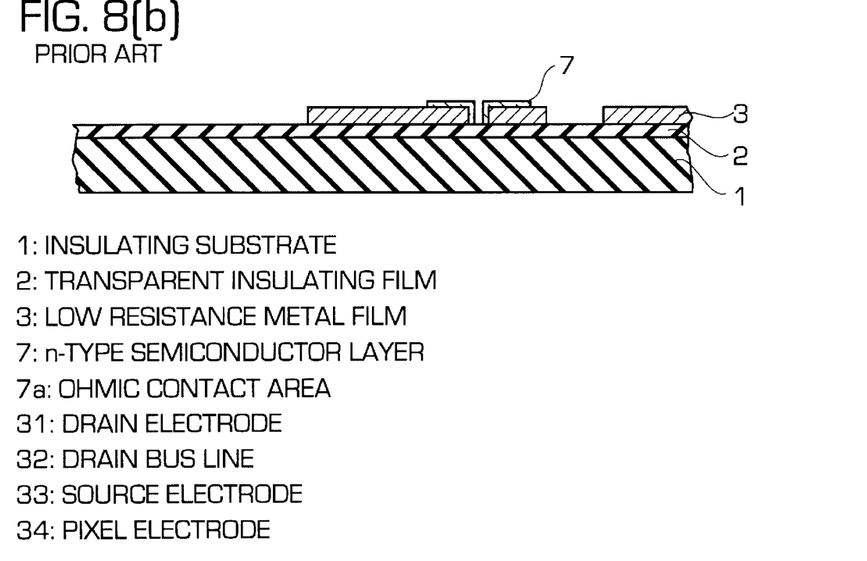
Figure 9A:
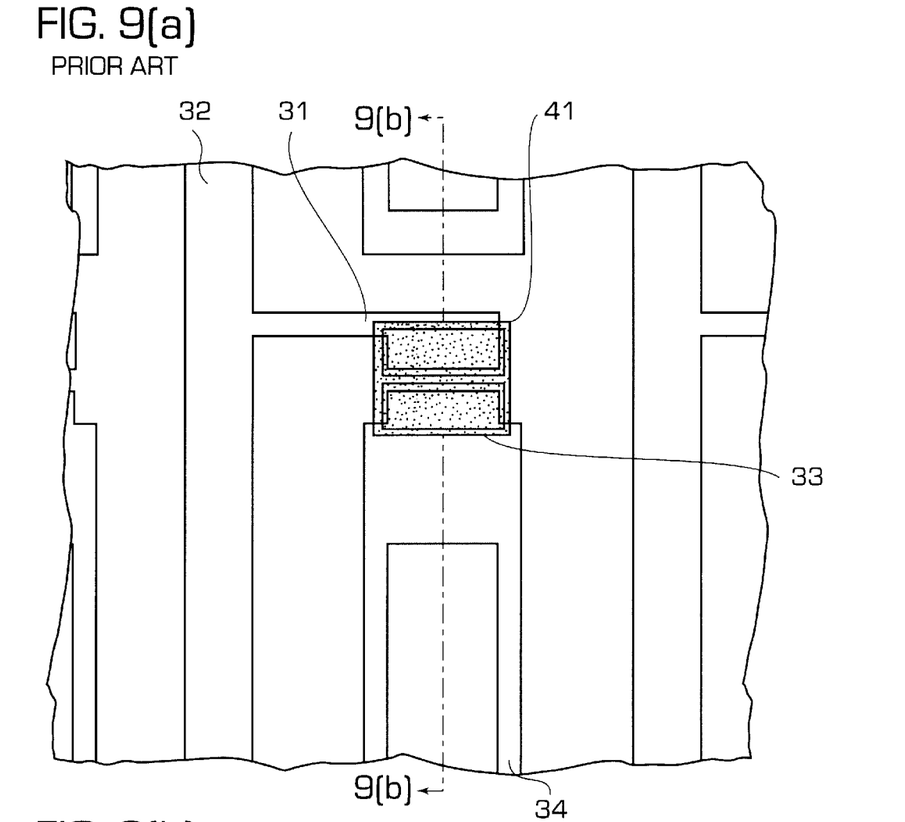
FIGS. 9(a) to 9(b) is a plan view for illustrating the production process (3) of the second conventional example and a cross-sectional view along line A—A.
Figure 9B:
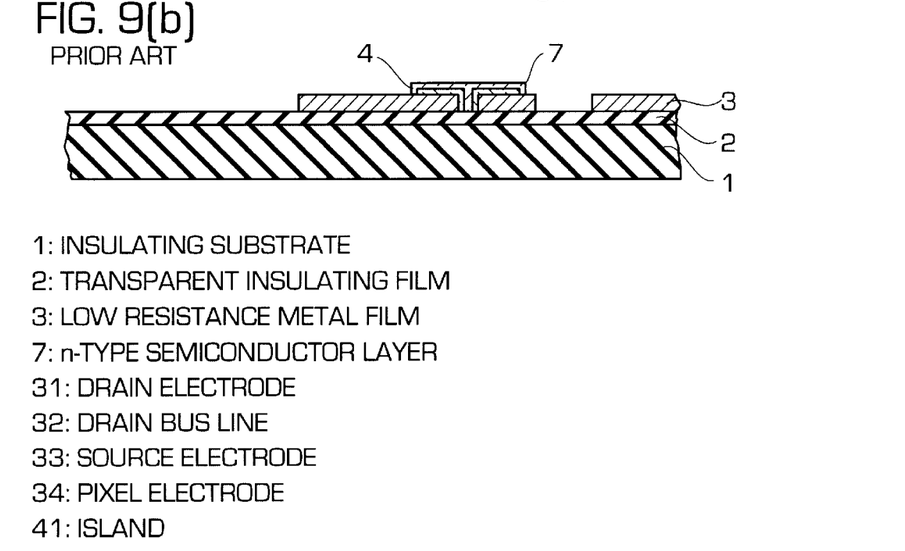

On the other hand, FIGS. 7 to 10 show, step-by-step, a production process for a transverse electrical field type active matrix liquid crystal display apparatus, employing a thin-film transistor as a switching element (second conventional example), as proposed in JP Patent Kokai JP-A-63-21907 (1988). In each of these figures, (a) and (b) are plan views and cross-sectional views taken along line AA, respectively. First, as shown in FIG. 7, a transparent insulating substrate 2 is formed on an insulating substrate 1 a low resistance metal film 3 of, for example, Cr, is formed thereon by sputtering. The resulting assembly is patterned by a photolithographic process and wet or dry etching to form a drain electrode 31, a drain bus line 32 connected to the drain electrode 31, a source electrode 33 and a pixel electrode 34 connected to the source electrode 33. Then, as shown in FIG. 8, a n-type semiconductor layer 7 of, for example, n+a-Si, is formed by the plasma CVD method on the insulating substrate 1. The resulting assembly is patterned by the photolithographic process and wet or dry etching to form an ohmic contact area 7a on the drain electrode 31 and on the source electrode 33.

Figure 10A:
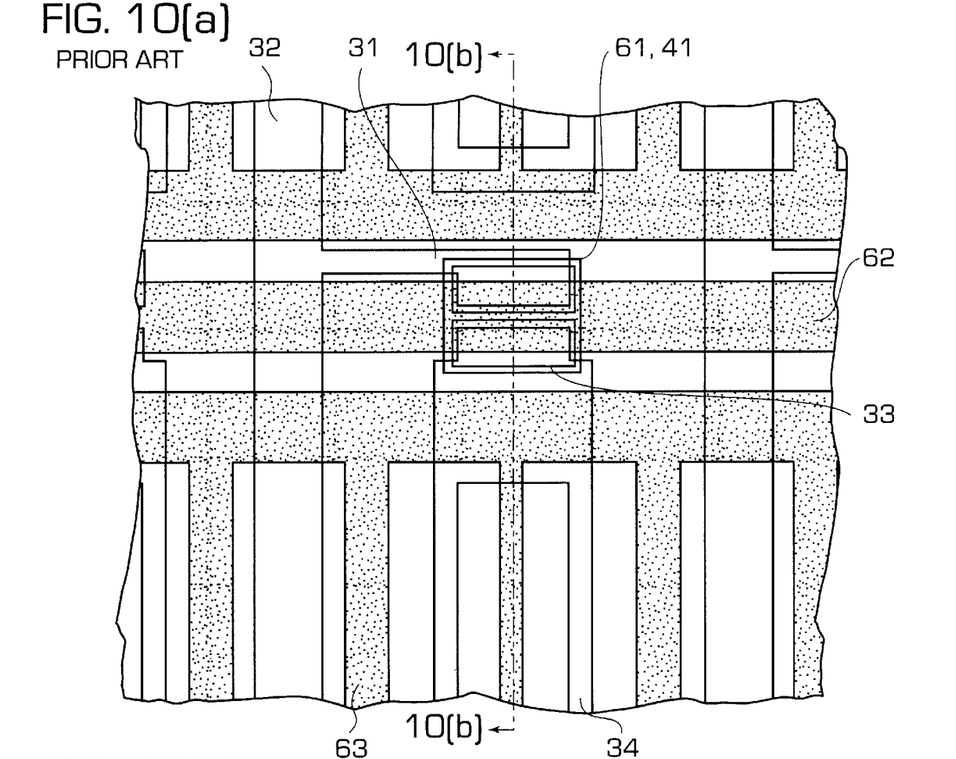
FIGS. 10(a) to 10(b) is a plan view for illustrating the production process (4) of the second conventional example and a cross-sectional view along line A—A.
Figure 10B:
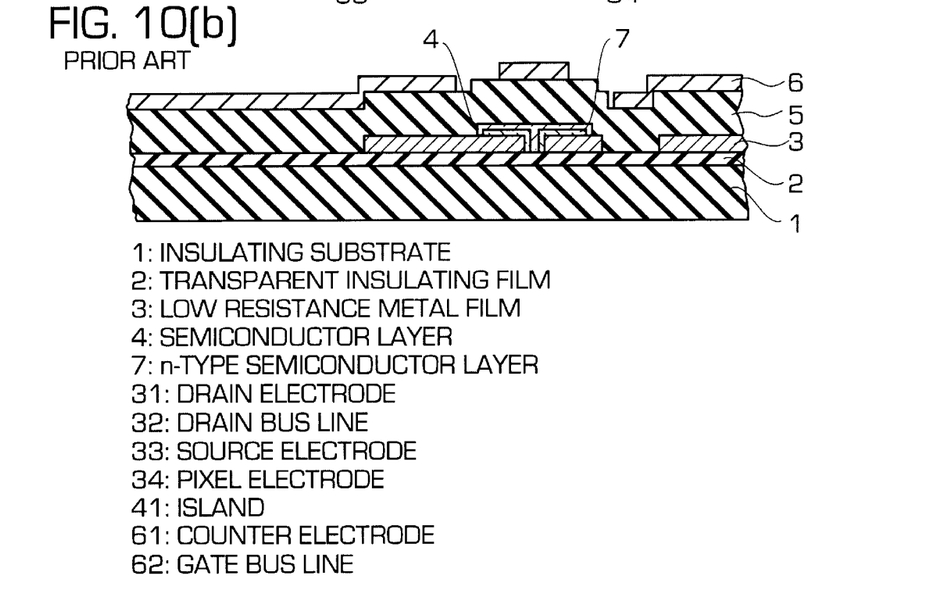

Then, a semiconductor film 4 of, for example, a-Si, is formed by a plasma CVD method on the insulating substrate and is patterned by the photolithographic process and wet or dry etching to form an island 41. Then, as shown in FIG. 10, a transparent insulating film 5 is formed by depositing SiN on the insulating substrate 1 by the CVD method and a low-resistance metal film 6 of Cr is formed by sputtering. This low-resistance metal film 6 is patterned by the photolithographic process and wet or dry etching to form the gate electrode 61, gate bus line 62 connected to the gate electrode 61, and the counter electrode 63.

Since this second conventional example is of the transverse electric field system, in which the pixel electrode 34 and the counter electrode 63 are formed on the sole insulating substrate 1, it is possible to drastically reduce the parasitic capacitance across the drain electrode 31 and the gate electrode 61 and the counter electrode 63 in a manner more meritorious than with the first conventional example described above. Moreover, with the present second example, since the liquid crystal is arrayed (oriented) in the transverse direction and is rotated transversely during driving, there is no fear of the liquid crystal molecules becoming perpendicular with respect to the substrate, while the liquid crystal molecules can hardly interrupt the light proceeding in an oblique direction, thus providing an advantage that the angle of visibility (visual field angle) is extended as compared to that possible with the first conventional example.

SUMMARY OF THE DISCLOSURE

However, various problems have been encountered during the investigations toward the present invention. Namely, this second conventional example has a drawback that the cost is high because a sum total of four lithographic steps are required with the second conventional example for transistor formation, meaning the increase of two steps as compared to the first conventional example. If the number of the photolithographic steps is increased, not only is the number of apparatus and parts to be used increased, but is the yield lowered due to increased rejects due to particles etc. thus raising the comprehensive cost.

It is therefore an object of the present invention to provide a transverse electrical field type active matrix liquid crystal display apparatus having a thin-film transistors as switching devices in which the number of production steps can be decreased, and to provide a method for producing same.

The present invention provides a transverse electrical field type active matrix liquid crystal display apparatus having thin film transistors as switching elements, in which there are formed on an insulating substrate carrying said thin-film transistors, each formed of a first low-resistance electrically conductive film, drain electrodes, drain bus lines connected to said drain electrodes, source electrodes and pixel electrodes connected to said source electrodes, with islands of a semiconductor film being formed thereon. There are further formed thereon gate electrodes, gate bus lines connected to the gate electrodes and counter electrodes in the shape of a comb having its teeth meshing with the pixel electrodes. The gate electrodes are formed of a second low-resistance electrically conductive film with interposition of a transparent insulating film above the islands provided that the gate electrode overlaps with at least part of the drain electrode and the source electrode. The islands are formed by a patterning which is the same as the patterning of the gate electrodes, the gate bus lines and the counter electrodes.

The present invention also provides a method for producing a transverse electrical field type active matrix liquid crystal display apparatus including the steps of:

forming a transparent insulating film and a first low-resistance electrically conductive film in this order on an insulating substrate;

patterning said first low-resistance electrically conductive film to form drain electrodes, drain bus lines connected to the drain electrodes, source electrodes and pixel electrodes connected to the source electrodes, respectively;

forming a semiconductor film, a transparent insulating film and a second low-resistance electrically conductive film in this order on said insulating substrate; and forming islands by said semiconductor film through patterning said second low-resistance electrically conductive film, the transparent insulating film and the semiconductor film into the same shape to form gate electrodes, gate bus lines connected to said gate electrodes and counter electrodes by said second low-resistance electrically conductive film, respectively.

In the present liquid crystal display apparatus, since the island is coextensive as the gate electrode, gate bus line and the counter electrode, the etching step of forming the gate electrode, gate bus line and the counter electrode and the subsequent island etching step can be executed as a sole photolithographic step employing the same photoresist, so that the transverse electrical field type active matrix liquid crystal display apparatus of a low resistance wiring can be fabricated by a sum total of two photolithographic steps. Since the display apparatus is of the transverse electrical field system, there is no necessity of forming the pixel electrodes by a transparent insulating film of high electrical resistance, while there is no necessity of adding a redundant step of metal plating for lowering the wiring resistance.

PREFERRED EMBODIMENTS OF THE INVENTION

Figure 1A:
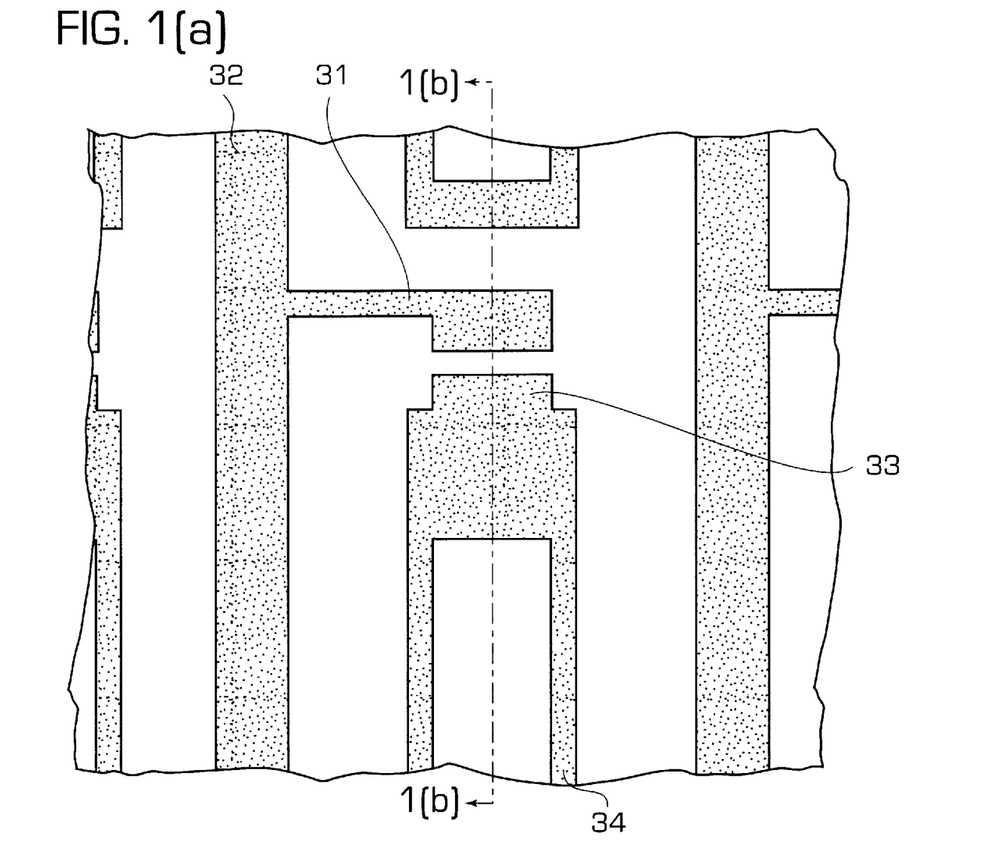
FIGS. 1(a) to 1(b) is a plan view for illustrating the first production process (1) embodying the present invention and a cross-sectional view along line A—A.
Figure 1B:
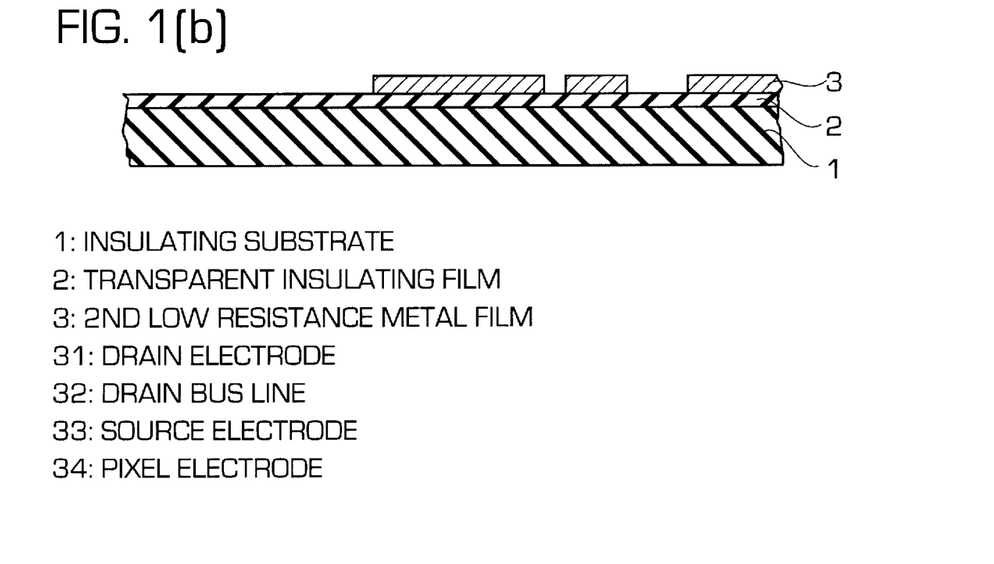
Figure 2A:
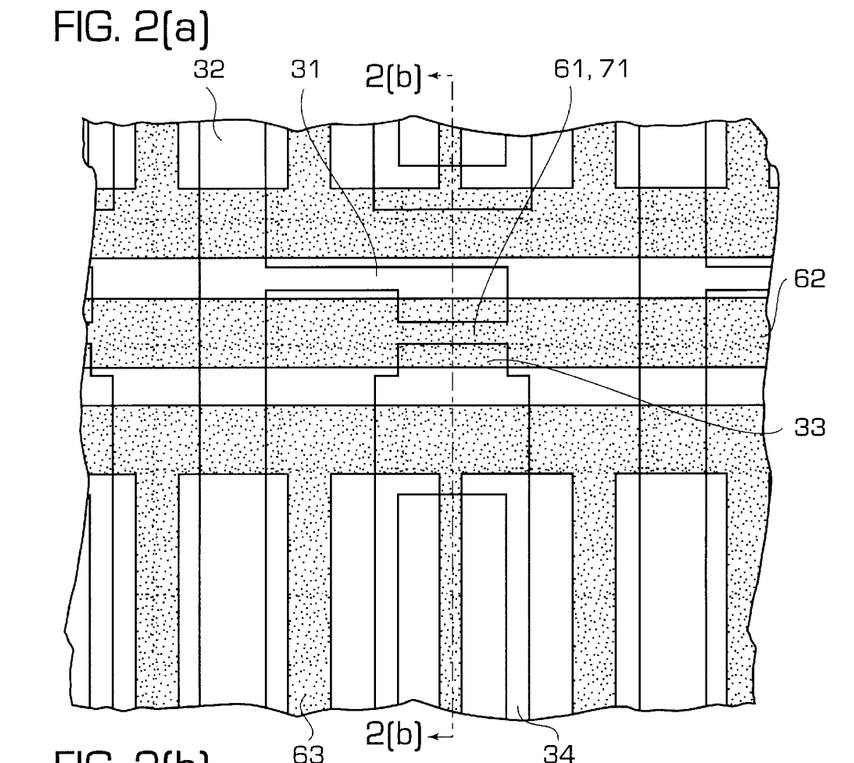
FIGS. 2(a) to 2(b) is a plan view for illustrating the second production process (2) embodying the present invention and a cross-sectional view along line A—A.
Figure 2B:
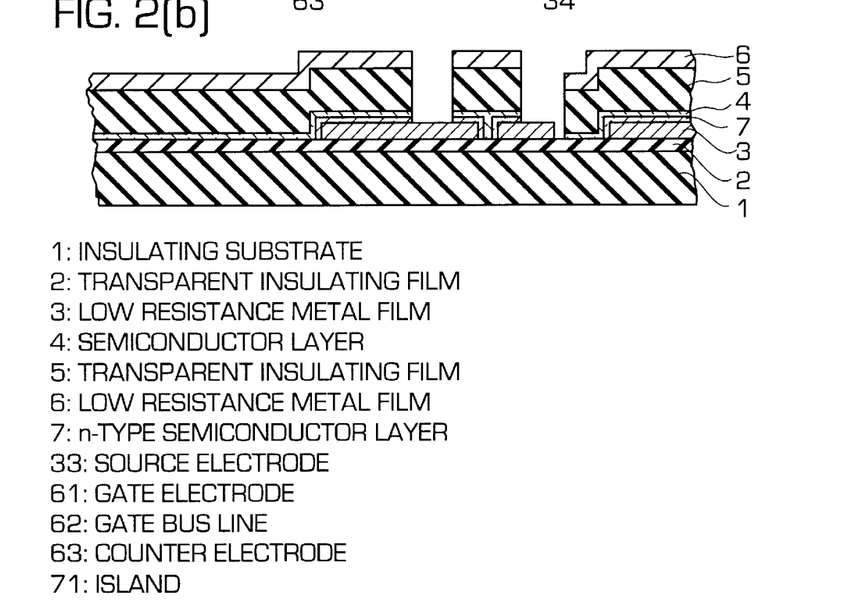
Figure 3:
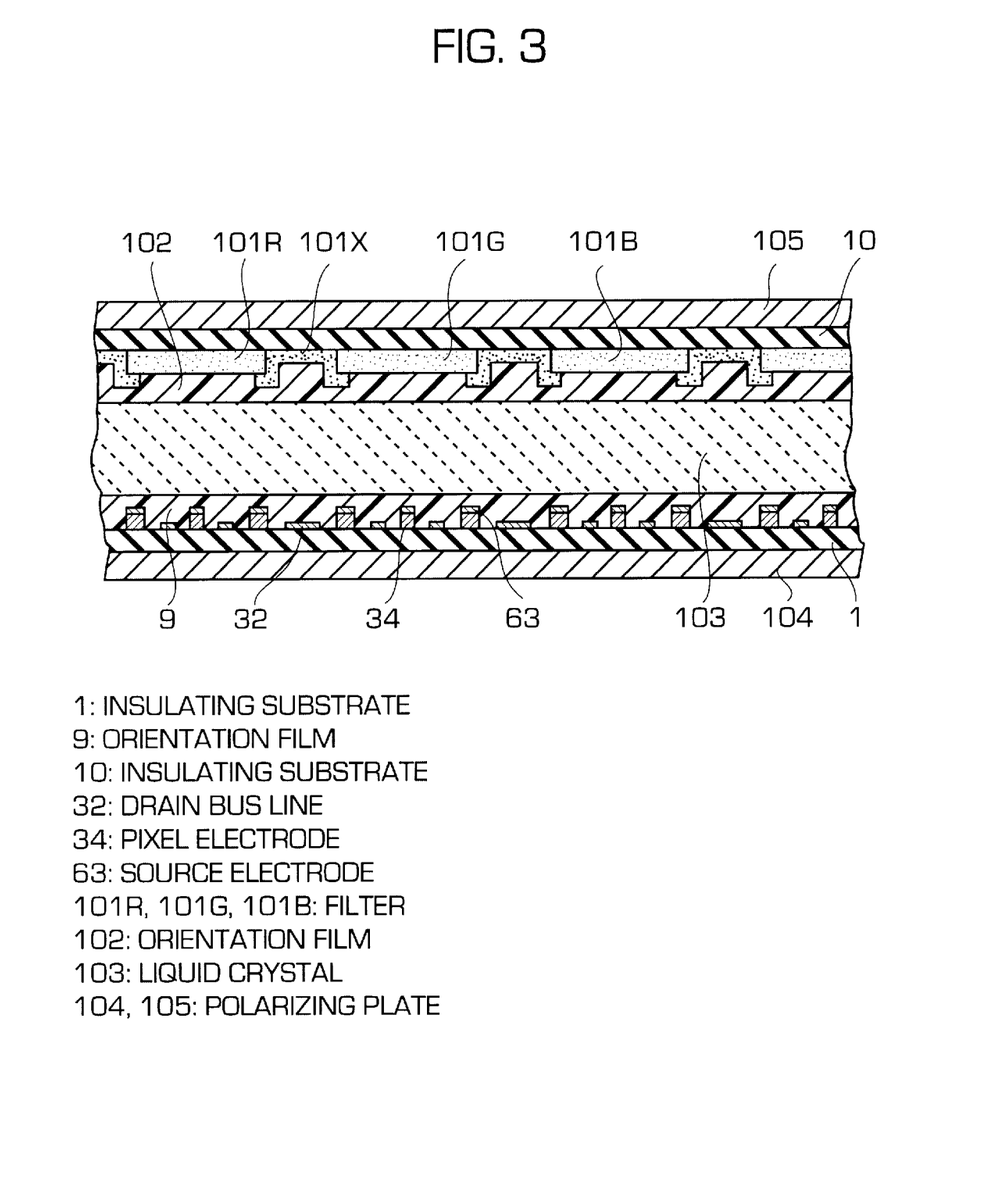
FIG. 3 is a cross-sectional view of a liquid crystal display apparatus fabricated in accordance with an embodiment of the present invention.

Referring to the drawings, preferred embodiments of the present invention will be explained in detail. FIGS. 1 to 3 are cross-sectional views showing, step-by-step, a production process for the transverse electrical field type active matrix liquid crystal display apparatus of the present invention. In FIGS. 1 and 2, (a) and (b) are plan views and cross-sectional views along lines A—A, respectively. First, as shown in FIG. 1, a transparent insulating film 2 of, for example, silicon oxide ($SiO_2$), having a film thickness of 100 nm, and a low-resistance metal film 3 of, for example, Cr, having a film thickness of 140 nm, are formed by sputtering in this order on the insulating substrate 1 of, for example, glass etc. Then, the resulting assembly is patterned employing a photolithographic process with the use of a photoresist, not shown, and Cr dry etching employing chlorine ($Cl_2$) and oxygen ($O_2$) to form a drain electrode 31, a drain bus line 32 connecting to the drain electrode 31, a source electrode 33 and a pixel electrode 34 connecting to the source electrode 33, respectively. The etched product is immersed at 70° C. in a solution of 70% of dimethyl sulfoxide (($CH_3$)$_2$SO) and 30% of monoethanol amine ($C_2H_4OHNH_2$) to peel off the photoresist film.

The insulating substrate 1 is then processed with plasma (pressure of 150 Pa, $PH_3$/Ar mixed gas ($PH_3$: 5000 ppm), flow of 1000 sccm, RF power of 50 W, and discharging time of 60 sec) to form an n-type semiconductor layer 7 selectively on only the low-resistance metal film. On the resulting assembly, there are also formed a semiconductor film 4 of, for example, a-Si etc., with a thickness of 50 nm, and an insulating film 5 of, for example, SiN etc., with a thickness of 300 nm, by the plasma CVD method, and a low-resistance metal film 6 of Cr etc., with a thickness of 140 nm, by sputtering. This low-resistance metal film 6 is patterned by a photolithographic process and Cr dry etching (plasma etching mode, pressure: 40 Pa, $Cl_2$ flow: 250 sccm, $O_2$ flow: 150 sccm; He flow: 150 sccm and RF power: 1400 W) to form a gate electrode 61, a gate bus line 62 connecting to the gate electrode 61 and a counter electrode 63. The semiconductor films 4, 7 are patterned, along with the insulating film 5, by SiN/a-Si dry etching employing sulfur hexafluoride (SF$_6$) (plasma etching mode, pressure: 40 Pa, SF$_6$ flow: 60 sccm, O$_2$ flow: 40 sccm, He flow: 150 sccm and RF power: 1200 W) to form an island coextensive (having the same pattern) as the gate electrode 61, gate bus line 62 and the counter electrode 63. The pixel electrodes 34 and the counter electrodes 63 are disposed in a comb-shape, respectively, and meshed with each other by the comb teeth of the pixel electrodes 34 and the counter electrodes 63, those being shifted relative to each other with respect to the arraying direction.

The insulating substrate, thus formed, is assembled in a transverse electrical field type active matrix liquid crystal display apparatus as shown in FIG. 3. That is, an orientation film 9 is formed on the surface on the side of an insulating substrate 1 carrying the electrodes. On the other hand, a counter substrate facing (opposing) the insulating substrate 1 with a preset separation distance therefrom has, on its opposing surface of the insulating substrate 10, patterned red, green and blue light-transmitting acrylic resin areas 101R, 101G and 101B, a patterned black matrix 101X, and an orientation film 102. The orientation films 9, 102, applied on the surfaces of the insulating substrates 1, 10, are processed with rubbing in a direction of 15 degrees relative to the drain bus line 32. After sealing the rim of the insulating substrates 1, 10, liquid crystal 103 is injected into a gap between the substrates. On the outer surfaces of the insulating substrates 1, 10 are stuck light polarizing plates 104, 105.

Thus, in the present liquid crystal display apparatus, in which, in the transverse electrical field type active matrix liquid crystal display apparatus, a forward staggered structure is used, and in which the island 71 is formed coextensive (substantially in the same pattern) as the gate electrode 61, the gate bus line 62 and counter electrode 63, the etching process for forming the gate electrode 61, gate bus line 62 and counter electrode 63 and the subsequent etching process for the island 71 can be completed by the sole photolithographic process exploiting the same photoresist. The result is that the two photolithographic steps of forming the ohmic contact layer and the island in the aforementioned second conventional example need not be provided as separate steps, thus enabling a transverse electrical field type active matrix liquid crystal display apparatus of low resistance wiring to be formed in a total of two photolithographic steps. Since the transverse electrical field system is used, there is no necessity of forming the pixel electrodes 34 with a transparent electrically conductive film of high resistance, such that there is no necessity of adding a redundant step of metal plating for lowering the wiring resistance.

It should be noted that, by setting the side of the openings of the counter electrode and the pixel electrode parallel to the direction of the electric field at the driving time to approximately 90 degrees with respect to the rubbing direction in each of the above-described embodiments, an electric field of adversely rotating the liquid crystal at the corners of the counter electrode and the pixel electrode is removed to eliminate the disinclination.

The meritorious effects of the present invention are summarized as follows.

In the present invention, in which the island is coextensive as the gate electrode, the gate bus line and the counter electrode, the gate electrode, gate bus line, counter electrode and the island can be formed by a sole photolithographic step, such that the transverse electrical field type active matrix liquid crystal display apparatus can be fabricated by a sole photolithographic step, with the result that the number of the photolithographic steps in the fabrication of the transverse electrical field type active matrix liquid crystal display apparatus and hence the cost can be reduced.

It should be noted that other objects of the present invention will become apparent in the entire disclosure and that modifications may be done without departing the gist and scope of the present invention as disclosed herein and appended herewith.

Also it should be noted that any combination of the disclosed and/or claimed elements, matters and/or items may fall under the modifications aforementioned.

What is claimed is:

1. A transverse electrical field type active matrix liquid crystal display apparatus having thin film transistors as switching elements, in which there are disposed, on an insulating substrate carrying said thin-film transistors, drain electrodes, drain bus lines connected to said drain electrodes, source electrodes and pixel electrodes connected to said source electrodes, each formed of a first low-resistance electrically conductive film, with islands of a semiconductor film being formed thereon, and in which there are further disposed thereon gate electrodes, gate bus lines connected to said gate electrodes and counter electrodes in the shape of a comb having its teeth disposed meshing with said pixel electrodes, each being formed of a second low-resistance electrically conductive film with interposition of a transparent insulating film above said islands provided that the gate electrodes overlapping with at least part of the drain electrodes and the source electrodes, wherein said islands form a pattern which is substantially the same as a combined pattern of the gate electrodes, the gate bus lines and the counter electrodes.

2. The liquid crystal display apparatus as defined in claim 1, wherein a lower layer semiconductor film is selectively formed on the surfaces of said drain electrodes, drain bus lines, source electrodes, and pixel electrodes, which were formed by the first low-resistance electrically conductive film and wherein the semiconductor film of said islands is formed on said lower layer semiconductor film.

3. A method for producing a transverse electrical field type active matrix liquid crystal display apparatus comprising the steps of:

forming a transparent insulating film and a first low-resistance electrically conductive film in this order on an insulating substrate;

patterning said first low-resistance electrically conductive film to form drain electrodes, drain bus lines connected to the drain electrodes, source electrodes and pixel electrodes connected to the source electrodes, respectively;

forming a semiconductor film, a transparent insulating film and a second low-resistance electrically conductive film in this order on said insulating substrate; and patterning said second low-resistance electrically conductive film to form a first pattern of gate electrodes, gate bus lines connected to said gate electrodes and counter electrodes, and patterning the transparent insulating film and the semiconductor film to form islands having a second pattern substantially identical to the first pattern.

4. The method for producing a liquid crystal display apparatus as defined in claim 3 further comprising the step of:

forming a lower layer semiconductor film on the surfaces of said drain electrodes drain bus lines, source electrodes and pixel electrodes which were formed by the first low-resistance electrically conductive film, wherein said semiconductor film forming said islands is formed on said lower layer semiconductor film.

5. The method for producing a liquid crystal display apparatus as defined in claim 3, wherein said patterning said second low-resistance electrically conductive film is carried out by etching based on a sole photolithographic step employing a single photoresist.

* * * * *